United States Patent
Sarkkinen et al.

(10) Patent No.: US 6,839,565 B2
(45) Date of Patent: Jan. 4, 2005

(54) METHOD AND SYSTEM FOR A MULTICAST SERVICE ANNOUNCEMENT IN A CELL

(75) Inventors: Sinikka Sarkkinen, Kangasala (FI); Jari Isokangas, Tampere (FI); Dimitris Koulakiotis, London (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/076,545

(22) Filed: Feb. 19, 2002

(65) Prior Publication Data

US 2003/0157949 A1 Aug. 21, 2003

(51) Int. Cl.[7] .................................................. H04Q 7/20
(52) U.S. Cl. .................... 455/503; 755/517; 755/414.1; 370/312
(58) Field of Search ................................. 455/503, 517, 455/518, 519, 466, 414.1, 414.2, 414.3, 414.4; 370/312, 337, 347

(56) References Cited

U.S. PATENT DOCUMENTS

2002/0077087 A1 * 6/2002 Li ........................... 455/414.1

2003/0039232 A1 * 2/2003 Casati et al. ............... 370/337

FOREIGN PATENT DOCUMENTS

EP          1006740 A2 *  6/2000   ............ H04Q/7/22

* cited by examiner

*Primary Examiner*—Nay Maung
*Assistant Examiner*—Philip J. Sobutka
(74) *Attorney, Agent, or Firm*—Antonelli, Terry, Stout & Kraus, LLP

(57) ABSTRACT

The present invention is related to a method and system for multicast service announcement in a cell that includes a core network, a UTRAN, and one or more mobile network nodes. The UTRAN includes a RNC. The RNC continuously sends multicast service announcements in a frame over a channel such as a PICH. The frame may include a type field and an indication field where the type field contains information related to the type of information in the indication field, or the frame may include a current service announcement identification field, a next service announcement identification field, and a time offset field. The type field can be used also to separate long term scheduling announcement or service advertising frames from the multicast/broadcast data frames, or the type field can be used to separate the multicast/broadcast control frames from the multicast/broadcast data frames.

34 Claims, 7 Drawing Sheets

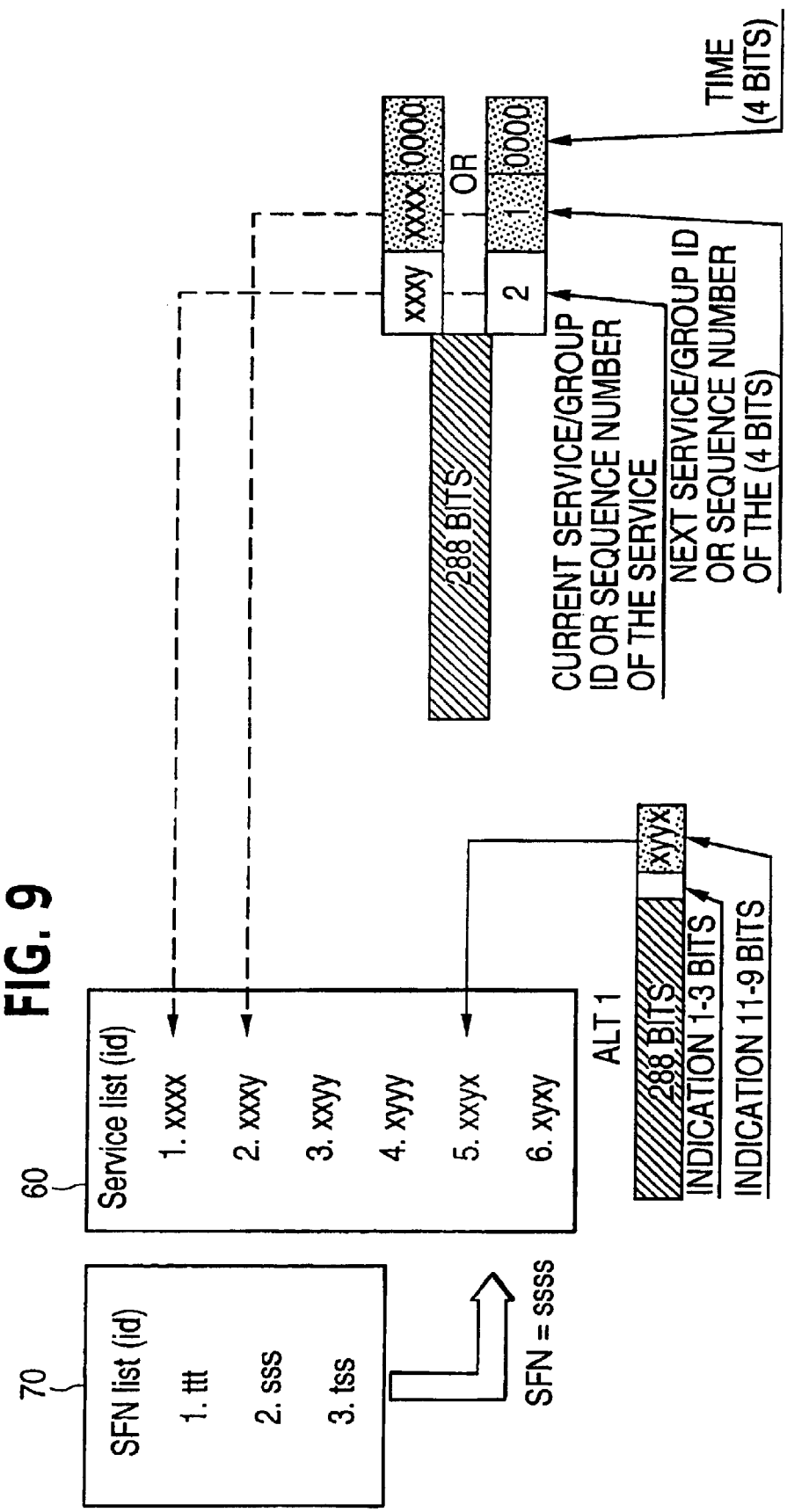

METHOD AND SYSTEM FOR A MULTICAST SERVICE ANNOUNCEMENT IN A CELL

BACKGROUND

1. Field of the Invention

This invention relates to $3^{rd}$ Generation Partnership Project (3GPP) Multimedia Broadcast/Multimedia Service (MBMS), and more specifically to MBMS multicast service announcements in a cell.

2. Discussion of the Related Art

Work has been started in 3GPP to standardize multicast as a new service. The aim in this work is to enhance the current capabilities not only in Universal Terrestrial Radio Access Network (UTRAN) but also in the Core Network (CN), as well as enhancing the capabilities of providing such services. These services use the common network resources, but are intended only to a restricted group of people in a cell. These requirements are not totally fulfilled in the current Cell Broadcast concept, which is already standardized in 3GPP release 99.

FIG. 1 shows a diagram of a UTRAN architecture. The architecture includes a core network 10 which is interconnected to a UTRAN 12 which provides over air information to one or more User Equipment (UE)14, 16. The core network 10 interfaces with UTRAN 12 via one or more interfaces 26. Interfaces 26 connect core network 10 to Radio Network Controllers (RNC) 20 that reside inside a Radio Network Subsystem (RNS) 18 in the UTRAN 12. The RNS also includes one or more Node B devices 22. The Node B 22 is a logical node in the RNS responsible for radio transmission/reception in one or more cells 24 to/from the UE. An RNC 20 is interconnected to other RNC 20 by a logical interface 28. The RNC interfaces with Node B 24 via a different interface 30. RNS 18 contains one RNC and is responsible for the resources and transmission/reception in a set of cells. RNC 20 is a logical node in the RNS in charge of controlling the use and the integrity of the radio resources. UTRAN is a conceptual term identity that is part of the network which consist of RNCs and Node Bs.

One part of the point-to multipoint concept is the transmission of multicast related data to the User Equipments (UEs), which are entitled to receive such data. This transmission cannot be provided efficiently, if the UEs are not aware of the agreed multicast services (agreed by the Network (NW) and configured, e.g. by an operator) before the actual multicast data transmission starts. The lack of the multicast service announcement procedure means that all multicast capable UEs should listen to the multicast related physical channel continuously, when they are not doing anything else, in order to be ready on that time when the transmission of the service is started. From a UE power consumption point of view, this is very disadvantageous. Therefore, it is very important that along with the multicast data transmission, the NW is capable of also informing the UEs about incoming multicast services.

The goal of an announcement procedure is not just to inform the UEs about the forthcoming and ongoing services, but also to perform the scheduling and the cell resource control at the network side, e.g., that variable bit rate is supported on such channel that is transmitting multicast data packets. In practice this means that the length of the multicast service can not be estimated until all data has been receive in RNC and, therefore, no long term accurate scheduling decision can not be made or indicated to any UEs in the cell.

In order to support more flexible service announcement procedure for multicast service the service announcement can be divided into two categories: long term service announcement and the short term service announcement. The long term service announcement is a data frame, which consists of information about such multicast services, which are defined to be sent to the cell, but no final and accurate scheduling decision has been made yet (i.e. resembles e.g. the TV-guide; news at 12 o'clock, stock news at 12.15 etc). The long term service announcement can also consist of multicast service advertisements.

The short term service announcement on the contrary contains information about the services to whom the accurate transmission time can be indicated and, therefore, this kind of announcement type should be continuous.

In order to support the long term service announcement the services of the short term service announcement procedure is required.

Although currently no service announcement procedure has been defined in 3GPP especially for multicast services, the 3GPP specifications already imply the concept of cell broadcast (for which one service announcement procedure has already defined). But unfortunately this procedure is not applicable as such for multicast because this procedure assumes that the length of the service is always known when the final scheduling decision (i.e. announcement frame) is made (please note that the all bits, which belong into one cell broadcast session are transmitted to a Radio Network Controller (RNC) inside one Service Area Broadcast Protocol (SABP) Service Data Unit (PDU)). Unfortunately, the knowing of such information in the RNC for multicast is impossible due to the different nature of the multicast service. When the maximum size of the cell broadcast session is limited to the size of 1246 bytes, no such restriction can be defined for the multicast session and, therefore, also no reliable pre-estimation of duration of each multicast session on the air interface can be made.

Another problem related to multicast service announcement is the requirement that UEs which are in IDLE mode and which are, e.g., just entered into the cell, should be capable of joining the session even though the service is already on going. This kind of requirement implies that the network should indicate the multicast service scheduling situation continuously, which is currently an impossible task to do.

SUMMARY

The present invention is related to a method and system for multicast service announcement in a cell that includes a core network, a Universal Terrestrial Radio Access Network (UTRAN), and one or more mobile network nodes. The UTRAN is operably connected to the core network and includes a Radio Network Controller (RNC). The RNC continuously sends multicast short term service announcements in a frame over a channel such as a Paging Indicator Channel (PICH). The mobile network node is operably connected to the UTRAN through the RNC. The enhanced frame on PICH may include a type field and an indication field where the type field contains information related to the type of information in the indication field. In another embodiment, the frame may include a current service announcement identification field, a next service announcement identification field, and a time offset field. The type field can also be used to separate long term scheduling announcement or service advertising frames from the multicast/broadcast data frames. The type field can also be used to separate multicast/broadcast control frames from multicast/broadcast data frames.

The present invention is also related to a method for multicast services announcements that includes: sending a signaling message containing one or more service announcement identification from a first network node to at one or more second network node; sending multicast service announcements continuously on a channel, each multicast service announcement having an associated service announcement identification; comparing the service announcement identification with multicast service identifications configured in the second node; checking the multicast service announcements on the channel associated with the service announcement identification that compares with the multicast service identifications; and receiving, at the second network node, the multicast service announcements associated with the at least one service announcement identification that compares with the multicast service identifications.

The present invention is further related to a method for multicast services announcements that includes: sending time information on a first channel, the time information conveying when a list of multicast services will be sent on a second channel; checking the time information at a first network node; checking current multicast services sent on a third channel if the time information is not currently available on the first channel; receiving the current multicast services at the second network node if the second network node is entitled to receive the current multicast services; checking an offset value time of when a next multicast services will be sent on the third channel if the second network node is not entitled to receive the current multicast services; receiving the next multicast services at the second network node after the offset value time if the second network node is entitled to receive the next multicast services; and waiting for the list of multicast services to be sent on the second channel if the second network node is not entitled to receive the current multicast services or the next multicast services.

Moreover, the present invention is related to a system for multicast services announcements that includes a core network, a Universal Terrestrial Radio Access Network (UTRAN) operably connected to the core network, and one or more mobile network nodes. The UTRAN includes one or more Radio Network Controller (RNC). The RNC continuously sends multicast service announcements in a frame over a channel such as a Paging Indicator Channel (PICH). The mobile network node is operably connected to the UTRAN through the at least one RNC. The enhanced frame includes a current service announcement identification field, a next service announcement identification field, and a time offset field.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 9 is a diagram of PICH frame structures using a multicast service announcements timing list according to an example embodiment of the present invention.

DETAILED DESCRIPTION

Figure 1:
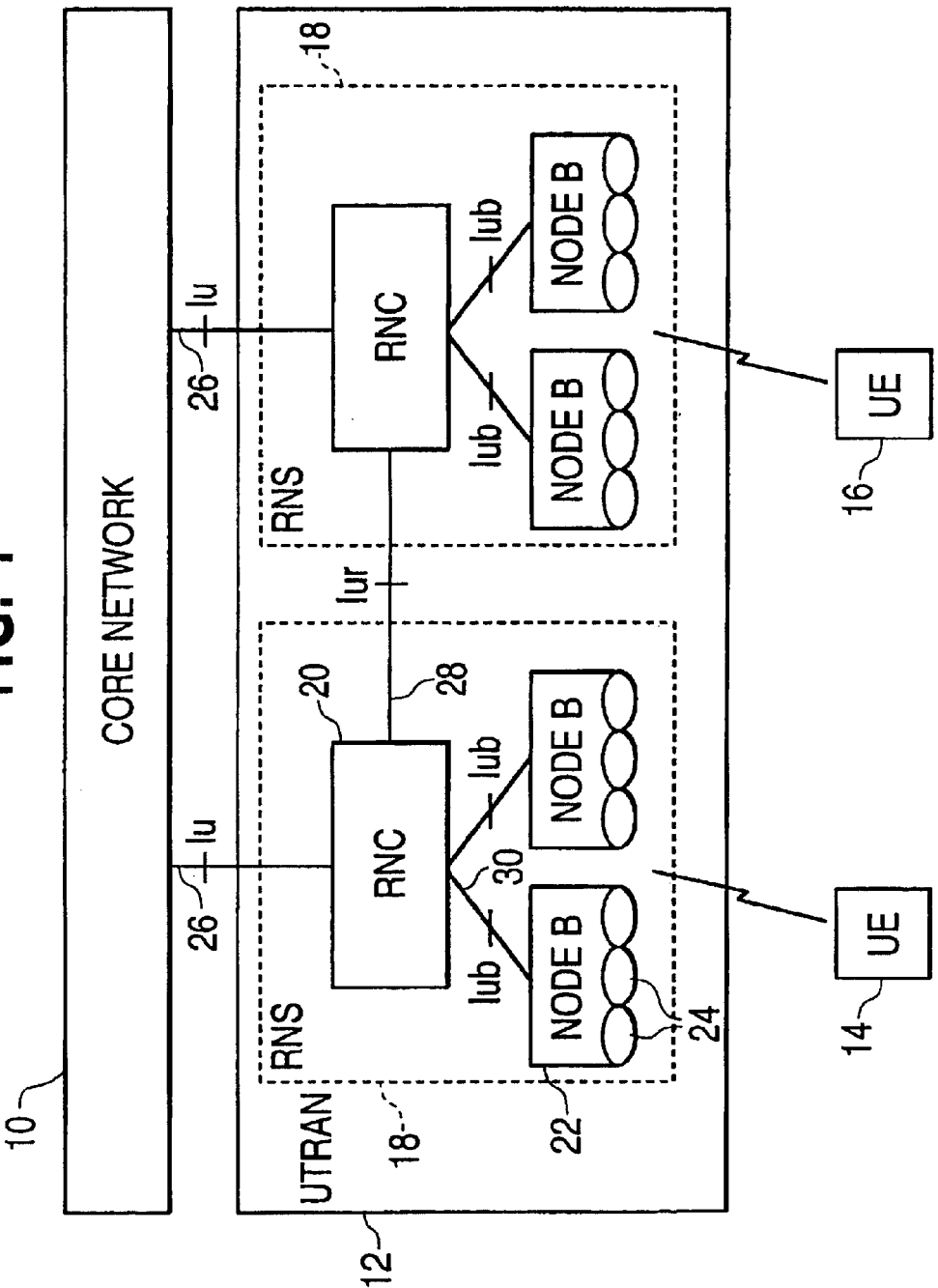
FIG. 1 is a diagram of a UTRAN architecture.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to the difference between the long term and the short term service announcement schemes. The present invention is also related to methods and systems for a long term and the short term multicast service announcement in a cell where a long term announcement frame can be sent less frequently (maybe a few times per day/hour) and with the aid of the short term announcement. A network may continuously indicate the status of the multicast service situation to the cell. This makes joining the multicast service much easier from a UE point of view. The present invention is also related to methods and systems for a multicast service announcement in a cell where networks indicate when the network is about to start the next multicast session in order to allow UEs to wake up on the correct moment. The present invention is also related to methods and systems for transmitting the long term service announcement or service advertising frame from the network to the UEs, in order to allow the UE to detect such frames from the multicast/broadcast data frame. The long term service announcement may require the services of short term service announcement procedure. User equipment (UE) according to the present invention may be a mobile network node (e.g., a mobile phone, Personal Data Assistant (PDA), or laptop computer) or non-mobile network node.

The present invention relates to an hierarchical service announcement model for multicast services on the air interface and how a channel (e.g., PICH) may be used to distinguish the long term multicast service announcement/advertising frames from the multicast data frames, distinguish the multicast control frame from the multicast data frame, indicate what kind of multicast service a UTRAN is currently scheduled to the air interface and what multicast services the UTRAN is going to scheduled next. The present invention also relates to providing a starting time of when the next service is planned to transmit on a channel, such as PICH, in order to decrease the time in which a UE should monitor a multicast related physical channel to find out the wanted multicast service on the air interface.

The present invention provides for a long term service announcement procedure upon which a network may indicate what kind of multicast services the network is going to support on the air interface. Note, depending on how this information is given to the UE, i.e., with the aid of SIB signaling or as a direct service announcement, that during this time, the network may not provide information as to what will be the transmission order, timing, or the length of the service. For example, when the services of the SIB signaling is used the network may only define a multicast services identifier, such as a service identification or group identification, based on which a UE is capable of knowing whether the UE is authorized to receive any of these multicasts. This may be analogous to high level paging, without any acknowledgement from the UE.

Next, the UE may try to find out what service the network is currently transmitting, and which service will be the next service. All this information may be transmitted on a PICH channel, which in current systems is devoted only for transmission of Paging Indicator (PI) bits. The total length of a frame on a PICH channel is currently defined to be 300 bits, of which 288 bits are always reserved for transmission of the PI. In practice, this means that the 12 bits, which are left over, are not used for anything. Methods and systems for a multicast service announcement in a cell according to the present invention may use these 12 bits for multicast service announcements. The PICH channel is used when the UE is in either IDLE, Cell_PCH or a URA-PCH state. The present invention also provides a method and system for multicast service announcements when the UE is in the Cell_FACH or Cell_DCH states.

As noted previous, methods and systems for a multicast service announcement in a cell according to the present invention may use the unused 12 bits of a 300 bit PICH frame for multicast service announcements. The present invention may be implemented a variety of ways using the 12 bits for multicast service announcements in a UTRAN. Two example embodiments illustrating the present invention will be discussed.

Figure 2:
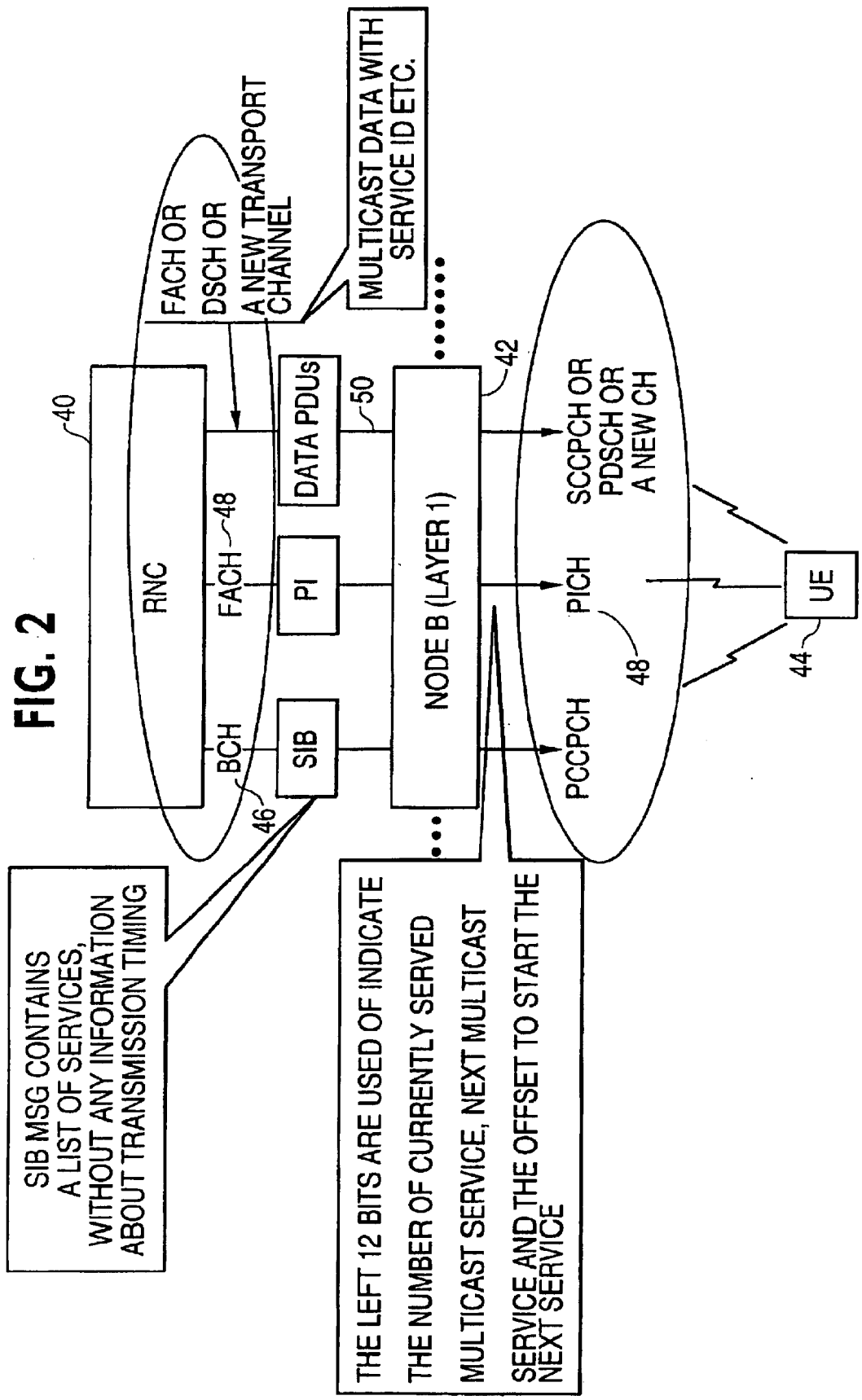
FIG. 2 is a diagram of a system for multicast service announcements according to an example embodiment of the present invention.

FIG. 2 shows a diagram of a system for multicast service announcement in a cell according to an example embodiment of the present invention. A RNC 40 interfaces with a Node B (layer 1) 42 that provides over air services to one or more User Equipment (UE) 44. RNC 40 has one or more channels to Node B 42 for communicating different types of information. These transport channels provide an information transfer service that the physical layer offers to Media Access Control (MAC) and higher layers. The physical layer transport services maybe described by how and with what characteristic data are transferred over the radio interface. These transport channels may include a Broadcast Channel (BCH) 46, a Forward Access Channel (FACH) 48, a channel that transfers data Protocol Data Units (PDUs) 50, etc. The transport channel 50, that may transport data PDUs, may consist of a FACH, a Downlink Shared Channel (DSCH), or a new transport channel. The Node B 42 communicates to User Equipment 44 over physical channels (ie, air interface). Depending on the mode (e.g., FDD), the physical channel may be defined by code, frequency, and in the uplink, relatively phase (I/Q). In a different mode (TDD), the physical channel may be defined by code, frequency, and time-slot. These physical channels may include one or more channels, for example, a Primary Common Control Physical Channel (PCCPCH), a Paging Indicator Channel (PICH), a Secondary Common Control Physical Channel (SCCPCH) or a new channel. The BCH transport channel 46 may transport System Information Block (SIB) messages. The FACH channel may send Paging Indicator (PI) messages in a frame.

In one embodiment of the present invention, the UE may be in idle mode, and a list of multicast services, known by UTRAN may be included in a SIB signaling message or this information can be sent inside a separate multicast service announcement frame. The list may contain a multicast service announcement identification, such as the service ID or multicast group ID, to which multicast data is meant for. The frequency to update this list by the RNC may vary and may be dependent on the implementation used.

Figure 3:
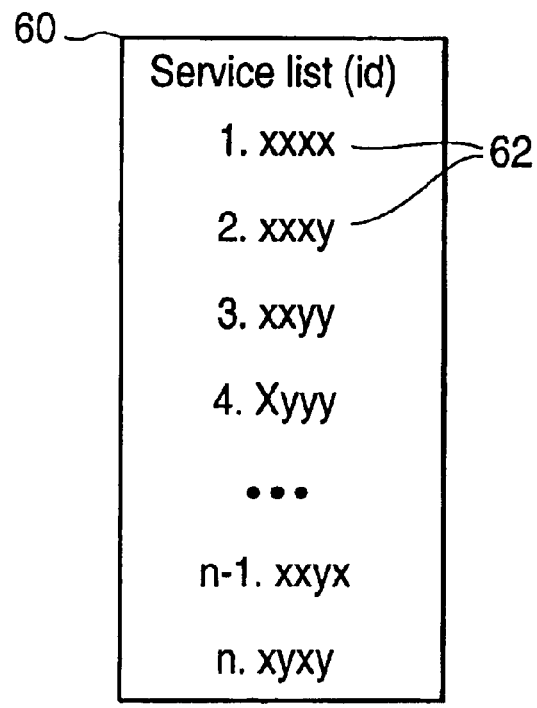
FIG. 3 is a diagram of a multicast service announcements list according to an example embodiment of the present invention.

FIG. 3 shows a diagram of a multicast service announcement list according to an example embodiment of the present invention. The list may contain a number of multicast service announcement identifications 62. The multicast service announcement identification 62 may be listed in the order that they will be broadcast. A User Equipment, after reviewing this list 60, is informed as to when multicast service announcements will be broadcast with respect to each other.

The user equipment may read the list of services from the SIB signaling messages. If the user equipment detects that any of the service numbers on the list do not equal the multicast service numbers configured in the user equipment's memory, the user equipment may wait until the service list information is changed in the SIB message. However, if the user equipment detects that the list contains service numbers which are also configured in the user equipment's memory, the user equipment may check the multicast related information by monitoring the PICH channel.

The network may continuously send multicast related information in a PICH frame. A PICH frame may consist of 300 bits. The multicast related information may be contained in 12 bits of the 300 bits carried on the channel. This is because 288 of the bits may be used for PI, thus there are 12 remaining unused bits. If the user equipment detects that the network is sending multicast services in which the user equipment is entitled to listen, the user equipment may immediately start to receive the multicast data from the air interface. However, if the user equipment detects that the current multicast service is not configured in the user equipment's memory, the UE may check information about the next multicast service. If this next multicast service is one that is configured in the UE, the UE also checks the offset value from the PICH channel, which indicates the time when the network starts to transmit the next multicast session. During the time gap between reading this information and the indicated starting time, the user equipment may be silent or may perform other tasks already defined for the user equipment.

In another embodiment of the present invention, the SIB signaling may contain time occasions defining when UTRAN plans to send the list of long term multicast services on an agreed channel, e.g., FACH channel. The value of the System Frame Number (SFN) of the SCCPCH channel may be indicated on that SIB signaling message.

In another embodiment of the present invention, the PICH frame may contain time occasion information defining when UTRAN plans to send the list of long term multicast services on an agreed channel, e.g., FACH channel. The accurate timing information can be presented as, e.g., a System Frame Number, as an offset to the current frame number, etc.

Figure 4:
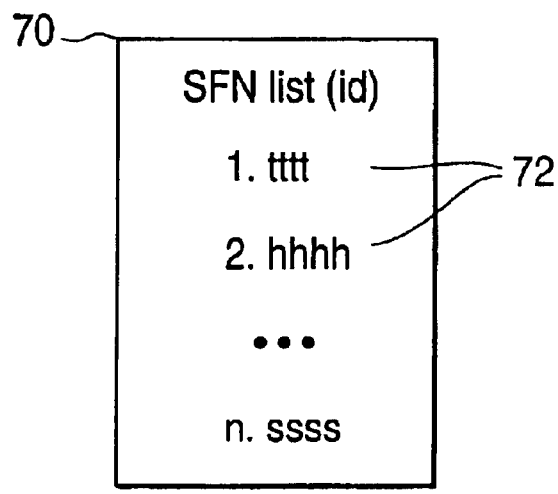
FIG. 4 is a diagram of a multicast service announcements timing list according to an example embodiment of the present invention.

FIG. 4 shows a diagram of a multicast service announcements timing list according to an example embodiment of the present invention. This list 70 contains a number of entries 72 that contain timing information. These times, 72, indicate when the network is going to send the multicast services list frame. This list 70, (which may also be called a System Frame Number (SFN) list) allows a user equipment to know when a multicast announcement services list frame may be broadcast on a channel. The values in SFN list 70 may be a time value, e.g., 10 ms, a value equal to a Transmission Time Interval (TTI), a frame number, or a predefined value.

If the user equipment notices that there is a long time before it is possible for the user equipment to receive the multicast service list frame, e.g., from FACH, the user equipment may check the current multicast service situation on the PICH channel. If the user equipment notices that the network is sending multicast service of which the user equipment is entitled, the user equipment may start to listen to the service from the air interface. If the current service is not one that the user equipment is entitled, but the next service is one that the user equipment is configured, the user equipment may check the offset value from the PICH frame and start to listen to the next multicast service at the time indicated by the offset value. If neither the current or next multicast service identification is known or configured in the user equipment, the user equipment may wait for the list from the network based on time information from the SIB signaling message.

If the user equipment is in Cell DCH state, the current situation on multicast related physical channel may be transmitted to each user equipment which are on a cell DCH via Dedicated Control Channels (DCCH), Dedicated Channel (DCH), Physical Dedicated Channel (PDCH), etc. In this scenario, a new Radio Resource Controller (RRC) message may be defined. The receiving of this message may not require any response from the user equipment.

Figure 5:
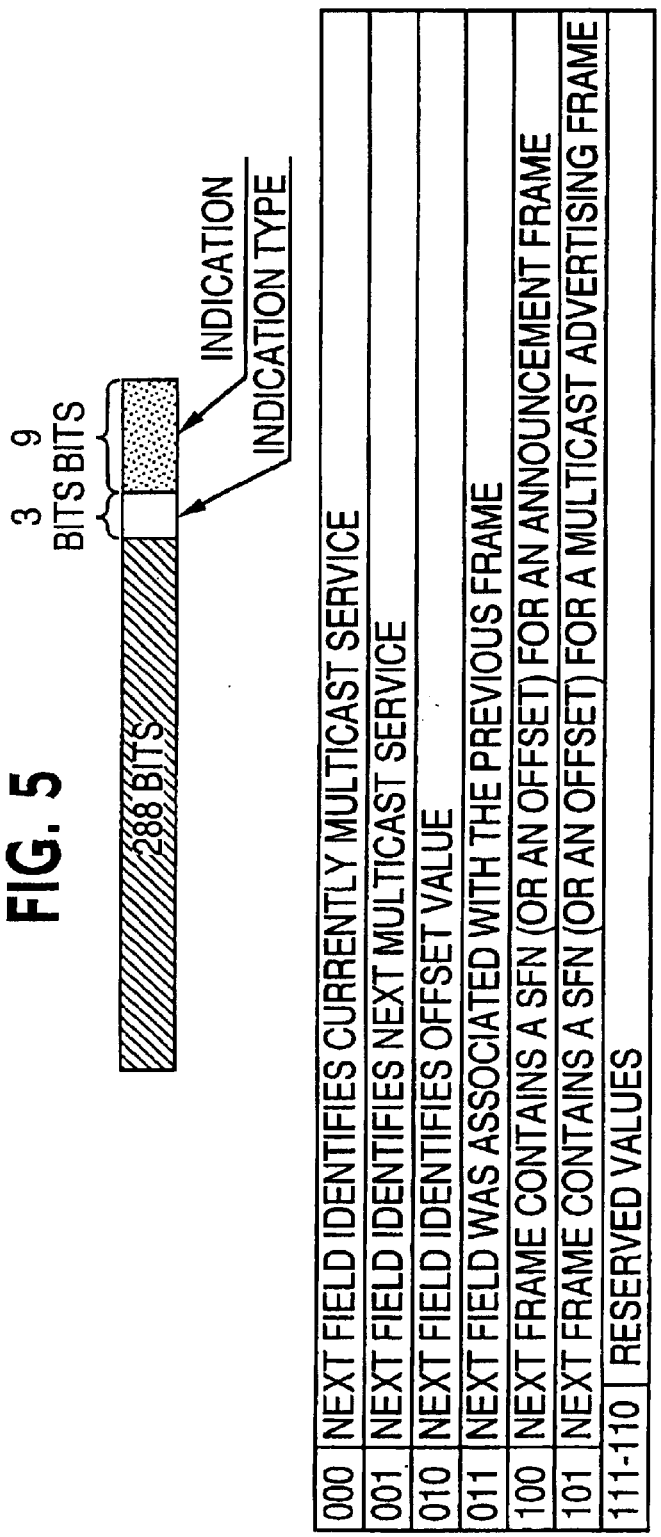
FIG. 5 is a diagram of the structure of a PICH frame according to a first example embodiment of the present invention.

FIG. 5 shows a diagram of the structure of a PICH frame according to a first example embodiment of the present invention. Currently, a PICH frame allows the transmission of 300 bits where 288 bits are reserved for transmission of a Paging Indicator (PI). The remaining 12 bits may be used to implement the present invention. One to three bits of the 12 bits may be reserved to indicate the type of information carried in the remaining 9 to 11 bits. The types may include "next field identifies the current multicast service", "next fields identifies the next multicast service", "next field identifies an offset value", "next field was associated with the previous PICH frame", "the frame contains a SFN (or an offset) for an announcement frame", and "the frame contains a SFN (or an offset) for a multicast advertising frame" (or the field may contain "The frame contain the multicast control frame"). The next field associated with the previous frame may be used to extend the indication field allowing for service identifications or group identifications longer than the 9–11 bits.

As discuss previously, the content of the offset value may be in terms of time, e.g., seconds, TTI, or equal to a predefined value. If the type field denotes that the next field is associated with the previous PICH frame, this may indicate that this information may be concatenated with the information contained in that same field in the previous PICH frame. The indication field of the PICH frame may be used for transmission of multicast service announcement identification information. This identification information may consist of a service identification, group identification, the serial number of the service in a list, an offset value, multicast service address, or some other information.

Figure 6:
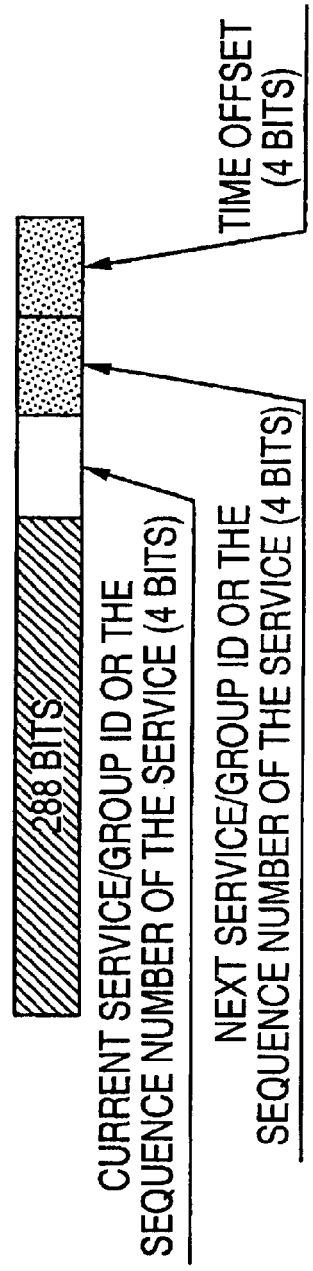
FIG. 6 is a diagram of the structure of a PICH frame according to a second example embodiment of the present invention.

FIG. 6 shows a diagram of the structure of a PICH frame according to a second example embodiment of the present invention. In this example embodiment, the 12 bits are split into equal sections of 4 bits. The first 4 bits may be reserved to indicate the current multicast service on the air interface. The second 4 bits may be reserved to indicate the identification of the next multicast service on the interface. The last 4 bits may be reserved for offset purposes. The first two 4 bit fields may contain multicast service announcements identification information such as service identification, group identification, serial number of the service in a list, etc. The content of the last 4 bits may provide an offset value by indicating a gap between the current SFN value and the SFN value of the first multicast related data frame of the next multicast session on the air interface. The offset value may consist of a value equal with 10 ms, a value equal to a TTI, a value equal to a predefined value, or some other value.

Figure 7:
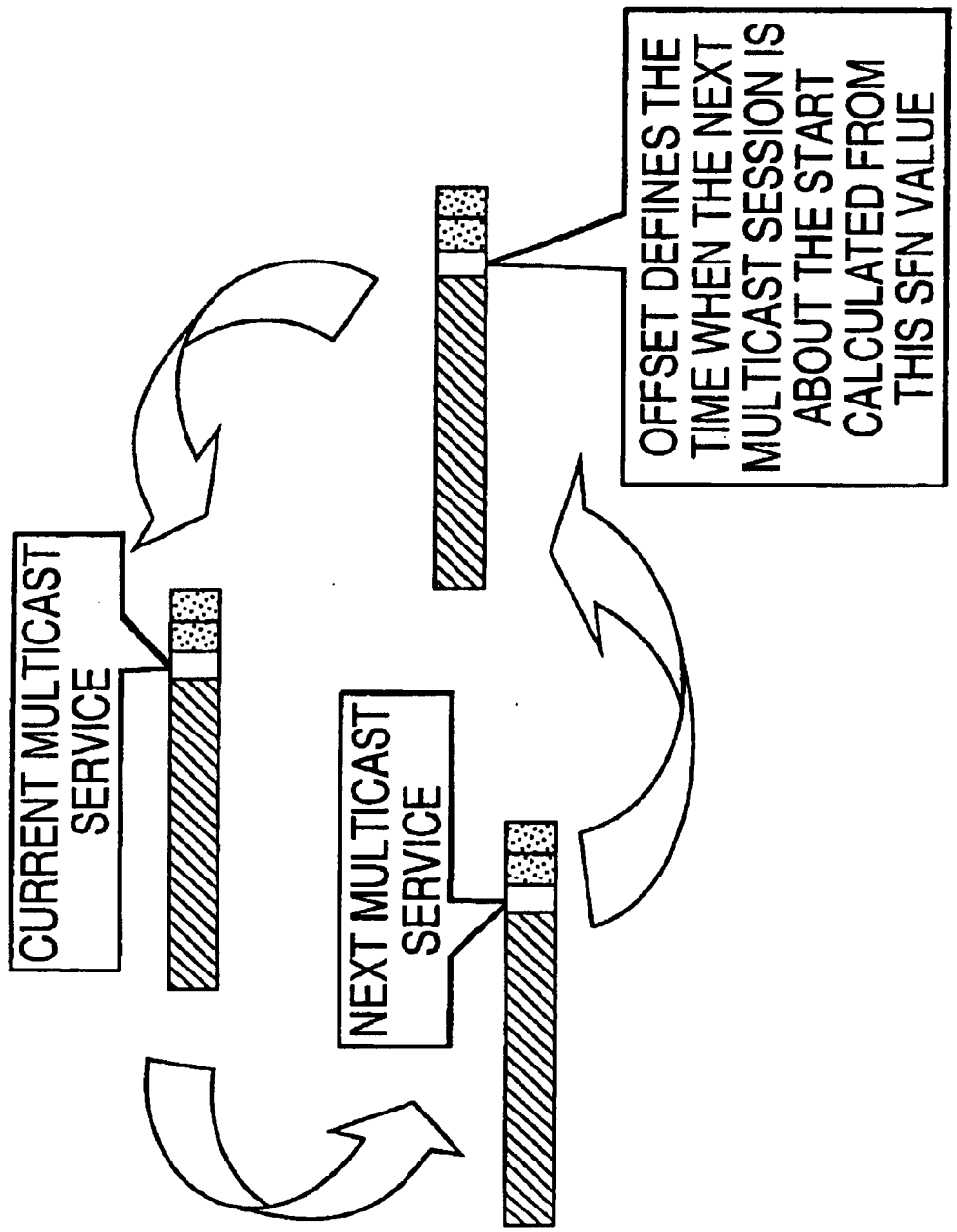
FIG. 7 is a diagram of cycles of a PICH frame structure according to an example embodiment of the present invention.

FIG. 7 shows a diagram of cycles of a PICH frame structure according to the example embodiment shown in FIG. 5. In the example embodiment shown in FIG. 5, the cycle to transmit all required information may take 3–5 radio interface frames (i.e., 30–50 ms) depending on the indication type field configuration.

If the example embodiment shown in FIG. 6 is used, the system may need only one radio frame (10 ms) to transmit the required information to the user equipments. Further, the frame structure in this embodiment may be implemented in both the discussed example embodiments of the present invention discuss previously. Since the use of a service identification or group identification may be limited to only 4 bits in this example frame embodiment, the allocation of multicast services may be restricted to 16 services that may be too small a number for operators. Therefore, this example embodiment frame structure may be more applicable when the field contains the serial number of the service in a list.

Figure 8:
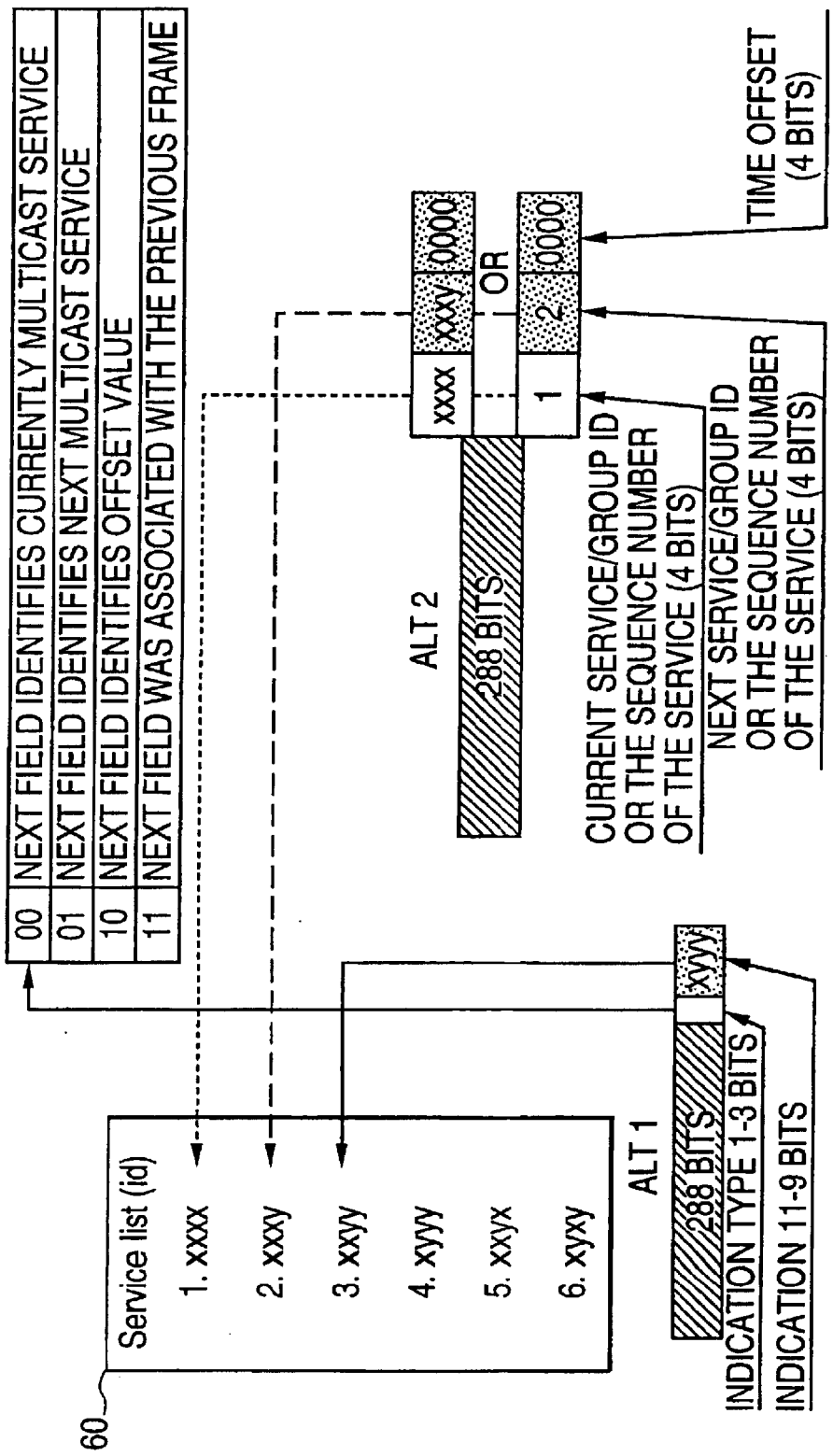
FIG. 8 is a diagram of PICH frame structures using a multicast service announcements list according to an example embodiment of the present invention.

FIG. 8 shows a diagram of PICH frame structures using a multicast service announcements list according to an example embodiment of the present invention. The frame embodiments are shown as Alt 1 and Alt 2. This diagram shows how the fields in the 12 bits in each example frame embodiment may be mapped to a service list. Note that in the Alt 1 embodiment (corresponding to the example embodiment of FIG. 5) the indication field maps to only one item in the service list. However, in the Alt 2 embodiment (corresponding to the example frame embodiment shown in FIG. 6), two fields in the frame are listed in the service list, since in this embodiment the frame may contain identifications for a current multicast service announcement and a next multicast service announcement.

FIG. 9 shows a diagram of a PICH frame structure using a multicast service announcements timing list according to an example embodiment of the present invention. Similar to FIG. 8, the fields in each embodiment are mapped to the service list. In this embodiment, the multicast service announcement identifications in the service list may not be in the order that they may be sent on the air interface. The SFN list contains the timing information denoting when particular multicast service announcement list frame may occur over the air interface.

Methods and systems for a multicast service announcement and a cell according to the present invention are advantageous for a number of reasons. For example, a user equipment is capable of joining to a multicast session as soon as it detects the wanted multicast service number from the PICH channel. Further, a user equipment as capable of joining to the multicast session even though the session is already going on. Moreover, user equipment is capable of knowing what kind of services the cell will support in the near future (SIP signaling or from FACH).

In addition, user equipment does not have to monitor the PICH channel all the time (due to the offset values). Further, user equipment does not have to waste any specific multicast service announcement occasion in order to find out what kind of service the network is going to support on that cell. User equipment implementation can decide when to listen to the multicast service announcements. In addition the use of long term announcement messages offers to the subscriber more time to join the multicast service group, which in practice smoothes the uplink traffic load on the air interface caused by the multiple simultaneous multicast group joining requests. Moreover, no feedback channel is needed upon service announcement phase. Also, according to the present invention, systems are allowed to support variable bit rate at the air interface. In addition, implementation of the present invention is possible with only small changes to the network and to user equipments.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for multicast services announcements comprising:

sending a signaling message containing at least one service announcement identification from a first network node to at least one second network node;

sending multicast service announcements continuously on a channel each multicast service announcement having an associated service announcement identification;

comparing the at least one service announcement identification with multicast service identifications configured in the second node;

checking the multicast service announcements on the channel associated with the at least one service announcement identification that compares with the multicast service identifications; and receiving, at the second network node, the multicast service announcements associated with the at least one service announcement identification that compares with the multicast service identifications, wherein the at least one service announcement identification comprises one of at least one service identification and at least one multicast group identification.

2. The method according to claim 1, wherein the first network node comprises a Radio Network Controller (RNC).

3. The method according to claim 1, further comprising sending the signaling message from the first network node to the at least one second network node in a System Information Block (SIB).

4. The method according to claim 1, further comprising sending the signaling message from the first network node to the at least one second network node on a second channel comprising a Paging Indicator Channel (PICH).

5. The method according to claim 1, further comprising sending the signaling message from the first network node to the at least one second network node on a second channel comprising a Broadcast Channel (BCH).

6. The method according to claim 1, further comprising waiting for a new signaling message containing at least one second service announcement identification if the at least one service announcement identification does not compare with any of the multicast service identifications.

7. The method according to claim 1, wherein the at least one second network node comprises User Equipment (UE).

8. The method according to claim 1, further comprising sending the multicast service announcements continuously on a channel comprising a Paging Indicator Channel (PICH).

9. The method according to claim 8, further comprising sending the multicast service announcements in a PICH frame.

10. The method according to claim 9, further comprising sending a PICH frame comprising a type field and an indication field, the type field containing information related to the type of information in the indication field.

11. The method according to claim 10, further comprising sending a PICH frame comprising 300 bits, wherein the type field comprises one of one, two, and three bits and the indication field comprises one of eleven, ten and nine bits, respectively.

12. The method according to claim 10, further comprising sending an indication field comprising one of the service announcement identification associated with the multicast service announcements currently being sent on the channel, the service announcement identification associated with the multicast service announcements to be sent next on the channel, an offset value indicating a gap between the multicast service announcements currently being sent on the channel and the multicast service announcements to be sent next on the channel, data to be concatenated with data sent in a preceding indication field, timing information to a long term multicast announcement frame, timing information to a multicast service advertising frame, and indication about a multicast control frame.

13. The method according to claim 12, wherein the service announcement identification comprises one of a service identification, a group identification, a serial number of multicast service announcements in a list, and System Frame Number for the long term multicast announcement or advertising frame.

14. The method according to claim 9, further comprising sending a PICH frame comprising a current service announcement identification field, a next service announcement identification field, a time offset field, long term service announcement frame indication, and multicast service advertising frame indication.

15. The method according to claim 14, wherein the current service announcement identification field contains one of a service identification, a group identification, a serial number of multicast service announcements in a list, System Frame Number, and an offset value.

16. The method according to claim 14, wherein the next service announcement identification field contains one of a service identification, a group identification, and a serial number of multicast service announcements in a list.

17. The method according to claim 14, further comprising sending a PICH frame comprising 300 bits, wherein the current service announcement identification field comprises four bits, the next service announcement identification field comprises four bits, and the time offset field comprises four bits.

18. A method for multicast services announcements comprising:
   sending time information on a first channel, the time information conveying when a list of multicast services will be sent on a second channel;
   checking the time information at a first network node;
   checking current multicast services sent on a third channel if the time information is not currently available on the first channel;
   receiving the current multicast services at the second network node if the second network node is entitled to receive the current multicast services;
   checking an offset value time of when a next multicast services will be sent on the third channel if the second network node is not entitled to receive the current multicast services;
   receiving the next multicast services at the second network node after the offset value time if the second network node is entitled to receive the next multicast services; and
   waiting for the list of multicast services to be sent on the second channel if the second network node is not entitled to receive the current multicast services or the next multicast services.

19. The method according to claim 18, further comprising sending the time information on the first channel that comprises a Broadcast Channel (BCH).

20. The method according to claim 18, further comprising sending time information in a System Information Block (SIB) on the first channel.

21. The method according to claim 18, further comprising sending the list of multicast services on the second channel comprising a Forward Access Channel (FACH).

22. The method according to claim 18, further comprising checking current multicast services sent on the third channel comprising a Paging Indicator Channel (PICH).

23. The method according to claim 18, wherein the first network node comprises a Radio Network Controller (RNC).

24. The method according to claim 18, wherein the second network node comprises User Equipment (UE).

25. A system for multicast services announcements comprising:
   a core network;
   a Universal Terrestrial Radio Access Network (UTRAN) operably connected to the core network, the UTRAN including at least one Radio Network Controller (RNC), the RNC continuously sending multicast service announcements in a frame over a channel; and
   at least one mobile network node operably connected to the UTRAN through the at least one RNC,
   wherein the frame comprises a type field and an indication field, the type field containing information related to the type of information in the indication field.

26. The system according to claim 25, wherein the channel comprises a Paging Indicator Channel (PICH).

27. The system according to claim 25, wherein the at least one mobile network node comprises User Equipment (UE).

28. The system according to claim 25, wherein the information field contains a multicast service announcement identification comprises one of at least one service identification and at least one multicast group identification.

29. The system according to claim 28, wherein the multicast service announcement identification comprises one of at least one service identification and at least one multicast group identification.

30. A system for multicast services announcements comprising:
   a core network;
   a Universal Terrestrial Radio Access Network (UTRAN) operably connected to the core network, the UTRAN including at least one Radio Network Controller (RNC), the RNC continuously sending multicast service announcements in a frame over a channel; and
   at least one mobile network node operably connected to the UTRAN through the at least one RNC,
   wherein the frame comprises a current service announcement identification field, a next service announcement identification field, and a time offset field.

31. The system according to claim 30, wherein the channel comprises a Paging Indicator Channel (PICH).

32. The system according to claim 30, wherein the at least one mobile network node comprises User Equipment (UE).

33. The system according to claim 30, wherein the information field contains a multicast service announcement identification comprises one of at least one service identification and at least one multicast group identification.

34. The system according to claim 33, wherein the multicast service announcement identification comprises one of at least one service identification and at least one multicast group identification.

* * * * *